United States Patent [19]

Khoury et al.

[11] Patent Number: 5,535,024
[45] Date of Patent: Jul. 9, 1996

[54] PHOTOREFRACTIVE HOLOGRAPHIC INTERFERENCE NOVELTY FILTER

[75] Inventors: Jihad Khoury, Somerville; Charles L. Woods, Stow, both of Mass.

[73] Assignee: The United States of America as represented by the Secretary of the Air Force, Washington, D.C.

[21] Appl. No.: 879,658

[22] Filed: May 6, 1992

[51] Int. Cl.$^6$ .................................................. G03H 1/02
[52] U.S. Cl. ......................... 359/7; 359/1; 359/10; 359/25; 359/300
[58] Field of Search .................................. 359/7, 10, 25, 359/15, 11, 1, 32, 300

[56] References Cited

U.S. PATENT DOCUMENTS

| 4,948,212 | 8/1990 | Cheng et al. | 359/7 |
| 5,018,852 | 5/1991 | Cheng et al. | 356/28.5 |

OTHER PUBLICATIONS

Abstract published at a conference CLEO 90, held Tuesday May 22 of 1990.

Paper authored by the applicants and Mark Cronin–Golomb, entitled "Photorefractive Holographic Interference Novelty Filter", dated 1 May 1991, published by Optics Communications.

*Primary Examiner*—Georgia Y. Epps
*Assistant Examiner*—Michael A. Papalas
*Attorney, Agent, or Firm*—Robert L. Nathans; Stanton E. Collier

[57] ABSTRACT

A novelty filter utilizes self-nulling and self-aligning of reflection and transmission phase conjugate beams. A photorefractive crystal is arranged so that the contributions to the phase conjugate are equal and opposite in the steady state to produce destructive interference when the input image is stationary, and thus no output image is displayed. If the image moves, then the gratings will rewrite and erase themselves, each with their own response times, total destructive interference will not occur, and transient enhancement and surpression of the phase conjugate output signal will indicate the direction of motion of the input image.

8 Claims, 3 Drawing Sheets

PHOTOREFRACTIVE HOLOGRAPHIC INTERFERENCE NOVELTY FILTER

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of novelty filters.

Novelty filters highlight the moving or changed part of an image while suppressing the static part. One possible application can be anticipated in telecommunication systems. When transmitting images in telephone lines on a pixel by pixel basis, it is impossible to transfer all the information in real time without loss in the resolution due to limitations in the bandwidth. One solution to this problem divides the information into two parts, the static part of the information, which is sent once, and the changed part, which is sent in real time. An implementation of this process is to place an optical novelty filter operating at TV rates between the image and the transmission device to identify the changed part in the new frame.

Recently many novelty filters have been demonstrated. Some of them use phase conjugate interferometers while others utilize the nonlinearities which are inherent in two beam coupling. Some of them use phase conjugate interferometers while others use the nonlinearities which are inherent in two-beam coupling. Up until now all self-aligning novelty filters required high gain photorefractive crystals such as barium titanate or semiconductors or sillenites with high applied electric fields. Novelty filters using the more easily grown low gain crystals without electrical fields such as bismith silicon oxide (BSO) and GaAs have required careful and stable alignment of the external pump beams. See J. Khoury et al., Optics Comm. 71, (1989) 137.

BRIEF SUMMARY OF EMBODIMENTS OF THE INVENTION

A new novelty filter is provided which combines the speed of externally pumped phase conjugation with the self-alignment stability of self pumped phase conjugation. This approach is based on interfering the two phase conjugate signals from the real time transmission and reflection gratings with different response times within a photorefractive crystal of bismuth silicon oxide (BSO). This technique provides self-alignment of the two diffracted beams when any incident beam drifts. The crystal is arranged so that the contributions to the phase conjugate are equal and opposite in the steady state. This self-nulling occurs when the object is stationary and no phase conjugate reflection is produced since the two contributions cancel each other within the crystal. If the object moves, then the gratings will rewrite and erase themselves accordingly. If for example, the transmission grating has a shorter time constant than the reflection grating, then the phase conjugate from the reflection hologram will lag behind the one from the transmission hologram and destructive interference will not occur in the transient regime.

This new novelty filter of the invention includes the following features: self-alignment, self-nulling, amplitude or phase input, high speed, simplicity, and safety as no high voltage is required. In addition, it is unique in its determination of the direction of motion, or of the sign of the temporal differentiation, through the transient enhancement and suppression in the erasing and writing edges.

BRIEF DESCRIPTION OF THE DRAWINGS

Other objects, features and advantages of the invention will become apparent upon study of the following description, taken in conjunction with the drawings in which.

DETAILED DESCRIPTION OF PREFERRED EMBODIMENTS OF THE INVENTION

Figure 1:
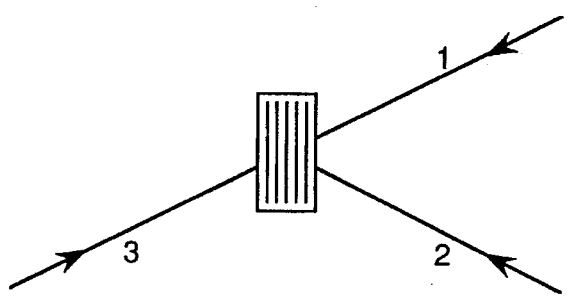
FIG. 1 illustrates a prior art degenerate four-wave mixing configuration.

FIG. 1 shows the case where three mutually coherent beams 1, 2 and 3 (beams 1 and 3 are counter propagating) are incident on the crystal. Beams 1 and 2 write a transmission hologram which is read out by beam 3. Simultaneously, beams 2 and 3 write a reflection hologram which is read out by beam 1 thereby generating an extra contribution to the phase conjugate. Thus the output is the interference between the two contributions from the conjugate beams.

In materials with small electrooptic coefficients such as BSO where the effect of two beam coupling is negligible, the Kogelnik theory holds for diffraction from a volume hologram. In steady state, the amplitude of the phase conjugate from the transmission hologram is equal to $$A_T = C_T(A_1 A_2) A_3 / I \tag{1}$$

while the amplitude of the phase conjugate beam that arises from the reflection hologram is given by, $$A_R = C_R(A_3 A_2) A_1 / I \tag{2}$$

with $$I = |A_1|^2 + |A_2|^2 + |A_3|^2$$

In the diffusion case, $C_T$ and $C_R$ are real numbers which are dependent on the crystallographic and optical parameters.

Equations 1 and 2 reveal that the phase of the phase conjugate beams, in both the reflection and transmission cases is locked to the phases of the input beams. The generation of two phase conjugate contributions which are opposite in phase requires finding a crystal orientation where the coupling constants are opposite in phase.

The large optical activity of BSO makes it generally possible to arrange positive or negative effective coupling coefficients over the entire interaction length depending on the crystal thickness, orientation, optical polarization, and the optical activity.

Figure 2:
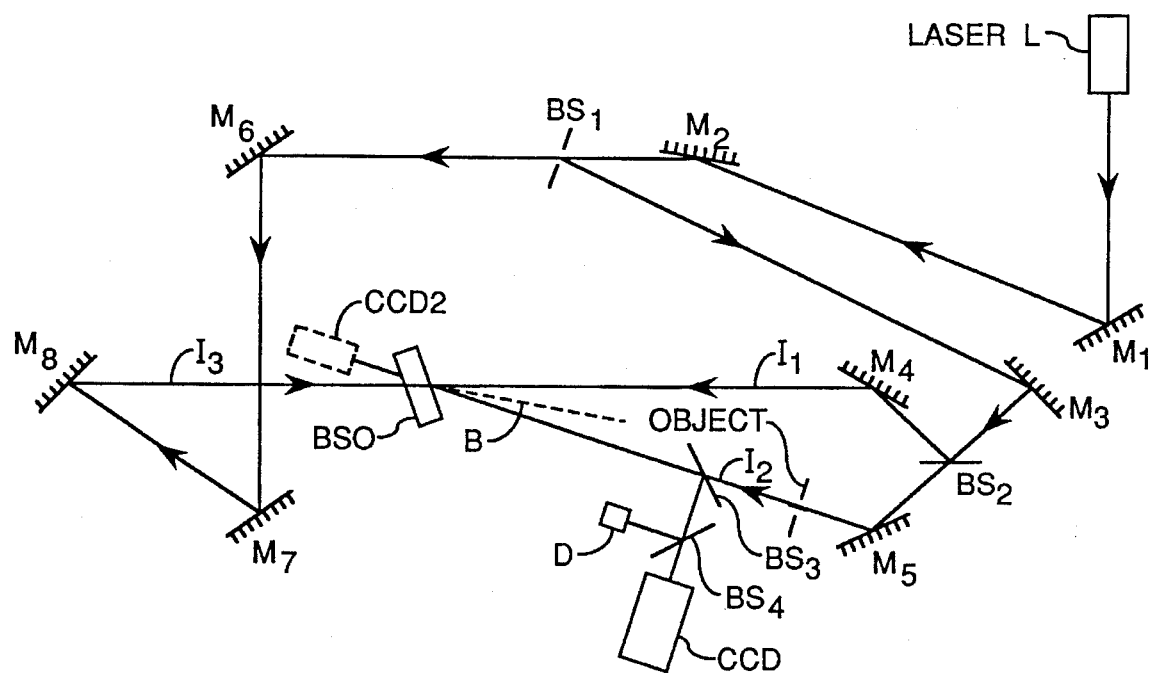
FIG. 2 illustrates a presently preferred embodiment of the present invention.
Figure 2A:
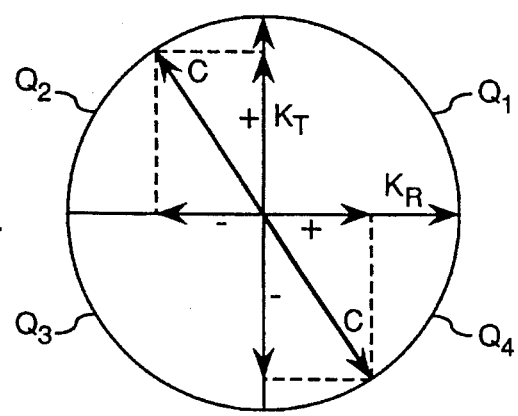
FIG. 2a illustrates the projection of the C-axis on the grating wave vectors to achieve various interferences to be described.

However, in photorefractive materials having a C-axis, such as ferroelectric material such as barium titanate, SBN, etc. positive and negative coupling coefficients can be achieved by choosing the projection of the C-axis on the wave vector of the transmission and reflection gratings to be in opposite signs. More specifically, as shown in FIG. 2A, the projections of the C-axis on the wave vectors $^KR_4$ and $K_T$ have opposite signs in quadrant 2 (Q2) and in quadrant 4 (Q4). The significance of this is that for any wavelength, the crystal thickness is not critical for achieving destructive interference between the two conjugates as desired in the practice of the invention.

In photorefractive materials the response time depends on several parameters such as grating spacing, externally applied electric fields, and the total intensity of the beams incident on the crystal. In the diffusion case, both the write and erase time are summarized by the relationship $$\tau_e = \tau_{d_i}(1+f_D(\Lambda)) \quad (3)$$

with $$\tau_{d_i} = \epsilon\epsilon_o/\sigma$$

where $\tau_{di}$ is the dielectric relaxation time, $\sigma$ is the conductivity which increases with increasing intensity and $$f_D(\Lambda) = \frac{4\pi^2\mu\tau_R k_B T}{e\Lambda^2} \quad (4)$$

Here $\Lambda$ is the grating fringe spacing, $t_R$ is the carrier recombination time, and $\mu$ is the carrier mobility.

From the relationship in Equation 3, it is clear that writing the hologram in the diffusion case for large angles (small grating spacing) is slower than writing the hologram for very small angles (large fringe spacing). FIG. 2 schematically illustrates a preferred embodiment of the invention actually operated by the inventors. The helium-neon laser L operated at 633 nm with total power of 30 mW, and the BSO crystal of dimensions 1 cm×2 mm had a face orientation of [100] and edge orientations of [110].

The beam was collimated to a diameter of 2 mm and then was divided into three input beams I1, I2, and I3 by mirrors M1-M8, beamsplitters BS-1, BS-2, and BS-3. The measured intensities of the three input beams, I1, I2, and I3 were 1.65 mW, 4 mW and 10.95 mW respectively. Beam I3 was at an angle of 170.30 degrees and beam I1 was at an angle of 9.30 degrees with respect to the object beam (beam I2) as shown in FIG. 2. These angles give grating spacings for reflection and transmission holograms of 0.126 and 4.4 microns respectively.

Beams I1 and I3 constitute first and second counter-propagating pump beams, whereas beam I2 constitutes a probe beam. All three of these beams are mutually coherent. Thus, the first pump beam I1 and the probe beam was used to write a first phase conjugate grating within photorefractive crystal 1 which was a fast real time transmission grating. The second counter-propagating pump beam I3 and the probe beam I2 wrote a second phase conjugate grating into the crystal which was a slow real time reflection grating. The second pump beam I3 reads the transmission grating whereas the first pump beam I1 reads the reflection grating. The probe beam I2 is modulated by an input image labelled object. If the input image is not moving or is not changed, the contributions to the phase conjugate output beam from the reflection and transmission gratings will destructively interfere so as not to produce an output image at the CCD video camera. Conversely, should there be a change in the image due to image motion or otherwise, an image will be produced as discussed in greater detail below due to the absence of destructive interference.

The <100> axis of the photorefractive crystal BSO was perpendicular to the plane of the intersection of the input beams. Under optimum conditions of overlapping and tilting, with the normal of the crystal by an angle of $\gamma=30$ degrees from the bisector B between I1 and I2 it was possible to achieve self-nulling at the output.

FIG. 3 illustrates the basic operation of the device when the input beams are switched on and off with a mechanical shutter. FIG. 3(a) shows the result with all the beams on; almost perfect subtraction occurs between the two phase conjugates. Residual spots are due to the unavoidable speckle that originated from beam I3, the most intense beam, during its passage through the crystal.

Figure 3A:
FIGS. 3a through 3d illustrates aspects of the basic operation of the apparatus of FIG. 2.
Figure 3B:
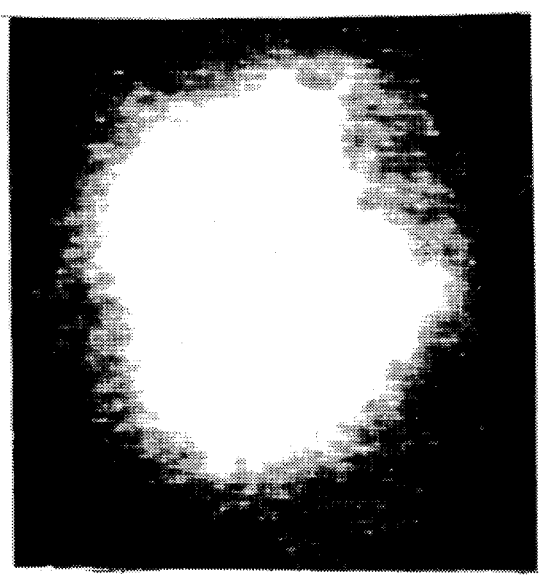
Figure 3C:

The results of closing and opening the shutter in beam 3, the strong pump, are shown in FIGS. 3(b) and 3(c) respectively. Blocking beam 3 eliminated the transmission hologram read-out beam and only the phase conjugate beam from the reflection grating appeared, which decayed after 7 seconds (the erasure time of the reflection hologram under illumination by beams 1 and 2). When beam 3 was subsequently unblocked we observed a brief transient signal which was the initial phase conjugate from the transmission grating (i.e. the grating that was written by beams 1 and 2 without strong erasure by beam 3 which had been blocked). A similar explanation with reflection and transmission exchanged quantitatively describes the transient phase conjugate signals which are observed when opening and closing the shutter in beam 1, the weak counter-propagating pump.

Figure 3D:
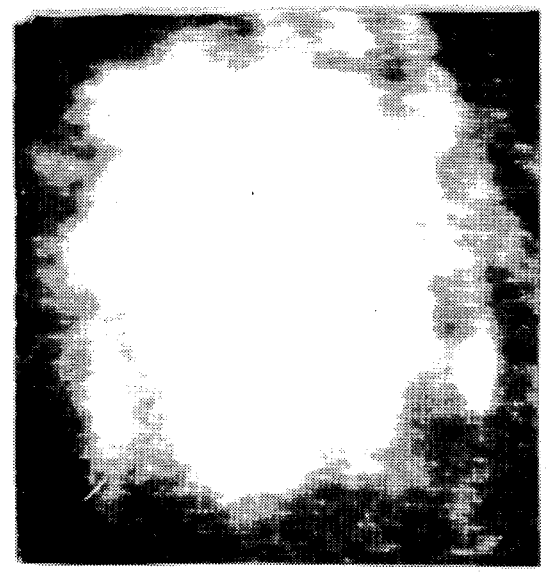

Novelty filtering is simulated by operating the shutter in beam 2, the probe beam. FIG. 3(d) shows the results immediately after blocking beam 2. The initial transient interference between the two phase conjugates is larger than the phase conjugates from the reflection or transmission hologram alone. However, when beam 2 was opened we observed a very weak signal (not shown here). It is clear therefore that the more sensitive mechanism of motion detection for slow motion is due to grating erasure rather than that of grating writing.

Figure 4:
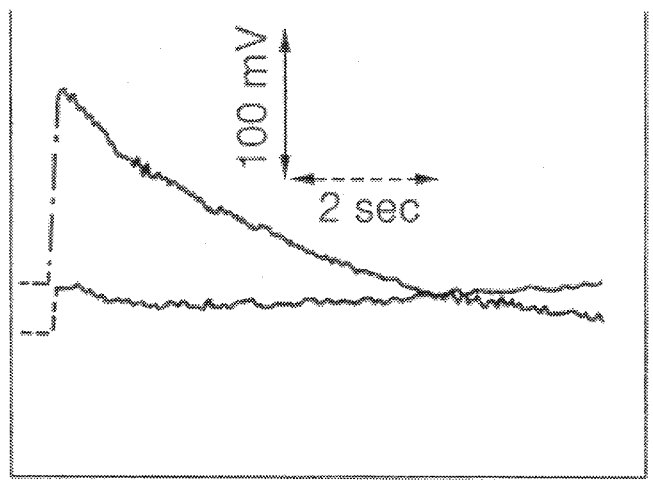
FIG. 4 illustrates certain photodetector measurements.

The temporal shape of this novelty filter simulation is shown in FIG. 4. The two oscilloscope traces were recorded on a digital storage scope from light arriving at a photodiode situated in the image plane when beam 2 was blocked (top trace) and opened (bottom trace) respectively. The top trace indicates that this signal reaches its peak intensity in 20 msec, which represents the response time of the transmission hologram under the illumination of beams 1 and 3. However, the complete decay of this signal was about 7 sec which is the decay time of the reflection hologram.

Conventional independent temporal grating theory can be applied to predict the writing and erasing dynamics. Using the initial exponential decay of the erase diffraction intensity for each hologram as measured with non-coherent read beams, the intensity scaled photorefractive response times at 633 nm are $$\tau_T I = 0.020 \text{sec cm}^2/W \quad (5)$$

measured for the transmission hologram when the object beam is blocked, and $$\tau_R I = 1.5 \text{sec cm}^2/W \quad (6)$$

measured for the reflection hologram when the object beam is blocked. Assuming independent grating dynamics, the intensity on erasure is predicted to be $$I(t) = I_{ss}\{\exp(-t/\tau_R) - \exp(-t/\tau_T)\}^2 \quad (7)$$

where the erase intensity of 0.41 W/cm² is used when the object beam is blocked. The dynamics of the write beams may be calculated with a similar approach and corrections for the equal beam diameters may also be included.

However, the two response times differ by two orders of magnitude and in the independent grating model for this device one may simply use the measured peak intensity as a fairly accurate measurement of the steady state diffraction intensity of the slower reflection grating on erasure and the faster transmission grating on writing. While the temporal measurements of FIG. 4 agree with the response time predictions of Equation 7, the peak intensity measurements contradict the independent grating model' prediction of equal write and erase peak intensities.

Blocking the probe beam produces a transient enhancement of the phase conjugate signal of 115%. The peak intensity (above background) of this signal is 220 mV which exceeds the intensity of the phase conjugate from the reflection hologram alone of 190 mV (obtained in a similar measurement when blocking beam 3). This effect may be explained by the competition of the two holograms for the charge carriers. The rapid erasure (20 msec) of the transmission hologram on blocking beam 2 releases carriers to the reflection hologram which then becomes stronger. Therefore, a transient intensity is observed in the phase conjugate reflection which is larger than the intensity of the phase conjugate from the reflection hologram alone.

Opening beam 2 should also cause a large transient signal due to the large difference in the writing response time of the reflection and transmission holograms. However, we observed a very strange effect in that almost no transient signal was observed as shown in the bottom trace of FIG. 4. The phase conjugate signal rises to the nulling level in 300 msec, but then slowly dips half-way to the blocked background level and rises back to the nulling level. This result indicates that in this case the transmission hologram writing time constant was as long as reflection grating writing time constant of 7 sec. These effects of transient phase conjugate enhancement/suppression and coupling in the time constants of the two holograms is under further theoretical and experimental investigation.

Figure 5A:
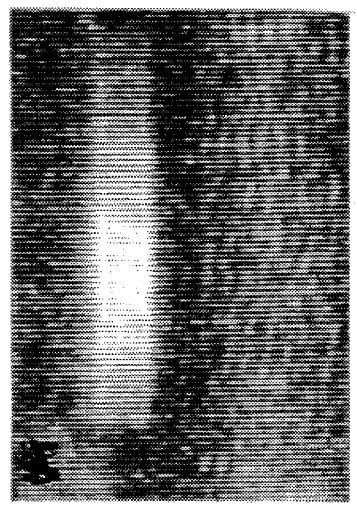
FIG. 5a–5d illustrates the results of motion as seen in the image plane.
Figure 5B:
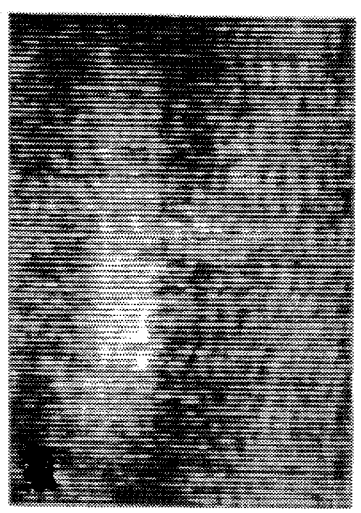
Figure 5C:
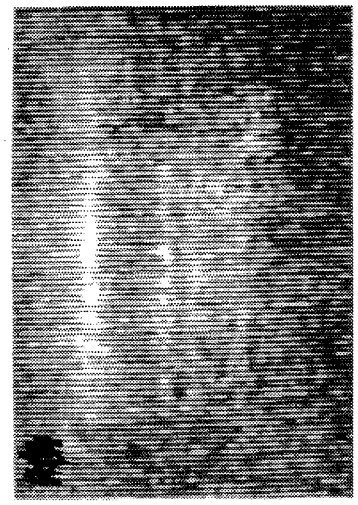
Figure 5D:
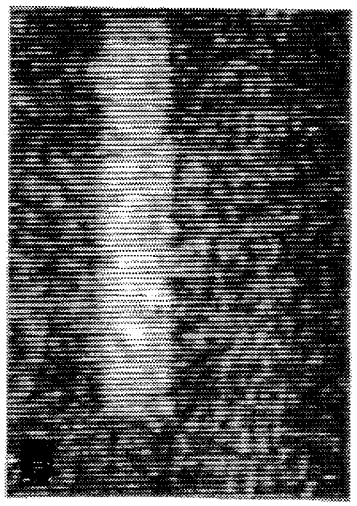

We studied the performance of this new novelty filter by placing a U.S. Air Force Resolution Chart 5 into the object beam (beam 2) and imaging it on the crystal. FIG. 5(a) shows the conjugate from the reflection hologram alone immediately after blocking beam 3. FIG. 5(b) is the result of static cancellation as observed in the image plane. FIG. 5(c) shows the image when the test chart was moved slowly in the horizontal direction. It can be seen that two vertical lines appear, a bright one due to the blocked parts of the beam (i.e. erasing cycle), and a dim one due to the writing cycle (i.e. from the parts where the beam was unblocked by moving the chart). When viewing this measurement in real time the edge enhancement appears more clearly. Also we examined the performance of our device under rapid motion of the chart in order to prevent writing the reflection hologram. The results are presented in FIG. 5(d) where only the faster transmission hologram is written. Improvement in the performance of this device should be possible by operating at a shorter wavelength (e.g. using a dye laser) to decrease the difference in the response times between the reflection and transmission holograms.

This asymmetry in the transient enhancement and suppression (while erasing and writing) determines the direction of motion of the bar, or equivalently the sign of the time derivative of the intensity. This capability, demonstrated here for binary inputs, is unique in novelty filters.

Another distinguishing feature of this new novelty filter is the alignment stability resulting from the overlap of the two phase conjugate signals. When any one of the three input beams in FIG. 1 is misaligned, the two output beams (now produced by non-degenerate four wave mixing and therefore only approximately phase conjugate) remain copropagating. In order to explain this, consider the degenerate case where $K_1-K_2$ and $K_3-K_2$ are the wave vectors of transmission and reflection holograms respectively. Therefore, the wave vectors of the two phase conjugates are given by $$(K_1-K_2)+K_3=-K_2$$

for the transmission hologram, and $$(K_3-K_2)+K_1=-K_2$$

for the reflection hologram.

If K3 is misaligned by wave vector $\Delta K$ (beams 1 and 3 are no longer counter-propagating), the resultant diffraction from the transmission hologram is given by $$(K_1-K_2)+(K_3-\Delta K)=-K_2+\Delta K$$

and the diffraction from reflection hologram is given by $$(K_3+\Delta K-K_2)+K_1=-K_2+\Delta K$$

It is clear that any misalignment of the input beams will not effect the overlap between the two diffracted beams. Misalignment of the counter-propagating pumps, $K\neq O$, in an externally pumped phase conjugate interferometer produces fringes and phase changes which have been used to demonstrate logic operations.

Other externally pumped novelty filters achieve stability by using a second (usually self-pumped) retroreflecting phase conjugate mirror to align the counter-propagating beams. It is clear that this new novelty filter combines the self-alignment of a self-pumped device and the speed of an externally pumped device. In addition, it operates with both amplitude and phase inputs as demonstrated by only three other novelty filters and can use a low optical quality device such as a liquid crystal TV as an input. However, high voltage applied fields are not required, and the slow intensity scaled response time and expense of barium titanate is avoided by using BSO. In addition, a speed increase of at least an order of magnitude could be obtained with this a device by using an argon laser instead of the helium-neon laser of this experiment.

The scope of the invention is to be defined by the terms of the following claims and substantial equivalents thereof. For example, another approach to designing the apparatus of the invention is to arrange the optical geometry so that the coupling coefficients of the transmission and reflection gratings have the same sign. For example, in ferroelectric material, this is achieved when the C-axis lies in quadrant Q1 or quadrant Q3 of FIG. 2a. This produces constructive interference between the two conjugate beams, and destructive interference between the beams diffracted into the direction of the probe beam. The output of this implementation of the novelty filter is in the direction of the probe beam. Thus, to record a moving image, the CCD camera would not be positioned as in FIG. 2 but would be positioned on the other side of the crystal and aligned with the probe beam. This is because the moving image will produce constructive interference at CCD2 but not at the original position of the CCD camera of FIG. 2. See in FIG. 2, the dashed representation of the CCD camera CCD2 in this mode. With this approach, materials with large electro-optic coefficients, such as barium titinate, are more convenient to use. Exiting from the crystal in the direction opposite to the aforementioned novelty filter output, an image intensified output appears which dims when the image changes, producing a negative version of the changes which appear in the novelty filter output. This second output is a method of enhancing the phase conjugate output, with two components with individual response times. The unchanged part in this intensified arm provides the static background image.

In conclusion, we have proposed and demonstrated a new technique of novelty filtering. Our approach relies on achieving self-nulling and self-alignment between two copropagating conjugate beams produced from degenerate four wave mixing in a single photorefractive crystal. One conjugate beam is diffracted from the transmission hologram, and one is diffracted from the reflection hologram. The transient signals are produced from the dependence of the response time on grating spacing, and the self-nulling is achieved by choosing the proper BSO crystallographic orientation, and beam parameters. Using this approach, the first interference of self-aligning reflection and transmission phase conjugate signals from a photorefractive crystal has been demonstrated.

We claim:

1. Method of employing four wave mixing to display a changing image in a field of view comprising the steps of:

(a) providing a photorefractive crystal;
   (b) writing a first phase conjugate grating within said photorefractive crystal by directing a first pump beam and a mutually coherent probe beam modulated by said image at said photorefractive crystal;
   (c) writing a second phase conjugate grating within said photorefractive crystal by directing said mutually coherent probe beam at said photorefractive crystal and directing a second pump beam, coherent with, and counterpropagating with respect to said first pump beam at said photorefractive crystal;
   (d) reading out the resulting interference pattern between the first and second phase conjugate gratings within said photrefractive crystal to produce an output beam;
   (e) orienting said photorefractive crystal to bring the contributions to the output beam from the first and second phase conjugate gratings into destructive interference in the absence of motion of said image;
   (f) and wherein said photorefractive crystal has a C axis, and including the step of producing positive and negative coupling coefficients of the gratings by choosing the projections of the C axis on the wave vectors of the first and second gratings to be of opposite sign.

2. The method of claim 1 wherein said second phase conjugate grating has a response time substantially different from the response time of the first phase conjugate grating.

3. The method of claim 2 wherein said first phase conjugate grating is a fast real time transmission grating and said second phase conjugate grating is a slow real time reflection grating.

4. A method of employing four wave mixing to display an image in a field of view comprising the steps of:

(a) providing a photorefractive crystal;
   (b) writing a first grating within said photorefractive crystal by directing a first pump beam and a mutually coherent probe beam modulated by said image at a first side of said photorefractive crystal;
   (c) writing a second grating within said photorefractive crystal by directing said probe beam at said photorefractive crystal and directing a second pump beam, coherent with and counterpropagating with respect to said first pump beam at a second side of said photorefractive crystal opposite said first side;
   (d) producing an interference pattern between diffracted output beams, produced by the gratings, travelling in the direction of the probe beam and emerging from the second side of the crystal; and
   (e) detecting said interference pattern at the second side of the crystal.

5. The method of claim 4 wherein said first and second pump beams are directed at said photorefractive crystal along a first optical axes and said probe beam is directed at said photorefractive crystal along a second optical axis which forms an acute angle with respect to said first optical axis.

6. The method of claim 4 wherein said photorefractive crystal has a face orientation of and edge orientations of.

7. The method of claim 4 wherein said second phase conjugate grating has a response time substantially different from the response time of the first phase conjugate grating.

8. The method of claim 7 wherein said first phase conjugate grating is a fast real time transmission grating and said second phase conjugate grating is a slow real time reflection grating.

* * * * *